United States Patent [19]
Kawamura

[11] Patent Number: 4,951,769
[45] Date of Patent: Aug. 28, 1990

[54] MOTOR VEHICLE DRIVING SYSTEM

[75] Inventor: Hideo Kawamura, Samukawa, Japan

[73] Assignee: Isuzu Motors Limited, Tokyo, Japan

[21] Appl. No.: 361,762

[22] Filed: May 30, 1989

Related U.S. Application Data

[63] Continuation of Ser. No. 304,911, Feb. 2, 1989, abandoned, which is a continuation of Ser. No. 921,699, Oct. 22, 1986, abandoned.

[30] Foreign Application Priority Data

Oct. 29, 1985 [JP] Japan ................. 60-241868

[51] Int. Cl.$^5$ ................. B60L 11/02
[52] U.S. Cl. ................. 180/65.4; 60/716
[58] Field of Search ........... 180/65.4, 65.2, 65.1; 60/716

[56] References Cited

U.S. PATENT DOCUMENTS

| | | | |
|---|---|---|---|
| 3,796,278 | 3/1974 | Shibata | 180/65.4 |
| 3,837,419 | 9/1974 | Nakamura | 180/65.4 |
| 4,099,589 | 7/1978 | Williams | 180/65.2 |
| 4,119,861 | 10/1978 | Gocho | 180/65.4 |
| 4,119,862 | 10/1978 | Gocho | 180/65.4 |
| 4,187,436 | 2/1980 | Etienne | 180/65.4 |
| 4,211,930 | 7/1980 | Fengler | 180/65.4 |
| 4,313,080 | 1/1982 | Park |  |

FOREIGN PATENT DOCUMENTS 59-204402 11/1984 Japan .

OTHER PUBLICATIONS

Electrotechnik & Maschinebau, vol. 93, No. 8, Aug. 1976, pp. 335-341, AT; G. Aichholzer: "Elektrohybridstrassenfahrzeuge-Entwicklungsstudie", p. 335; FIG. 3; p. 336.

Primary Examiner—David M. Mitchell
Attorney, Agent, or Firm—Staas & Halsey

[57] ABSTRACT

The electric power generated by an AC generator coupled to the output shaft of an engine is rectified into DC power that is then converted to AC power, which is supplied to drive a motor connected to a wheel. Dependent on the depth to which an accelerator pedal is depressed, the electric power supplied to the motor is controlled to control the speed of travel of a motor vehicle. When the motor is subjected to regenerative braking, the motor operates as a generator to produce electric power which is stored in a battery.

4 Claims, 2 Drawing Sheets

MOTOR VEHICLE DRIVING SYSTEM

This is a continuation of co-pending application Ser. No. 07/304,911 filed on Feb. 2, 1989, now abandoned which is a continuation of Ser. No. 921,699 filed Oct. 22, 1986 and now abandoned.

BACKGROUND OF THE INVENTION

The present invention relates to a motor vehicle driving system including a generator directly coupled to the power output shaft of an engine serving as a power source of a motor vehicle and a motor coupled to an axle and energizable by the electric output from the generator.

In motor vehicles driven by engines which operate at high speeds, the power output of the engines is transmitted to drive wheels through a gear mechanism that reduces the high speed of rotation of the engines Where a motor vehicle is driven by a gas turbine, since the speed of rotation of the gas turbine is about 200,000 r.p.m., the speed reduction ratio must be about 1/200 in order to transmit the power output to the axle.

Japanese Laid-Open Patent Publication No. 59(1984)-204402 discloses a hybrid automobile having an engine and a motor/generator driven by a battery. The wheels of the automobile are driven by the power output of at least one of the engine and the motor/generator through a torque converter and an automatic transmission. When the automobile is braked, the braking energy is recovered by the motor/generator to charge the battery.

Where the gear mechanism is used for speed reduction, the gear mechanism is complex, large in size, and highly costly because it is required to transmit large torques for driving the motor vehicle. The transmission efficiency of a one-stage speed-reducer gear mechanism is in the range of from 0.9 to 0.95, and hence, the transmission efficiency of a multi-stage gear mechanism used for reducing high-speed rotation is lower, resulting in an increased energy loss.

The proposal according to Japanese Laid-Open Patent Publication No. 59(1984)-204402 is disadvantageous in that the transmission efficiency of the torque converter and the automatic transmission which transmit the power output of the engine or the motor/generator to the axle causes an energy loss.

SUMMARY OF THE INVENTION

It is an object of the present invention to provide a motor vehicle driving system of high efficiency wherein the rotatable shaft of a motor is directly coupled to an axle for driving a motor vehicle and the electric power output from a generator on the output shaft of an engine is supplied to the motor to drive the motor vehicle.

Another object of the present invention is to provide a motor vehicle driving system of the type described above wherein the motor comprises an AC motor, and the power output from the generator is rectified and then converted by an inverter to AC power of a desired frequency to energize the AC motor.

Still another object of the present invention is to provide a motor vehicle driving system of the type described above wherein the motor comprises a DC motor, and the power output from the generator is rectified and supplied to the DC motor to energize the same.

A still further object of the present invention is to provide a motor vehicle driving system of the type described above wherein the motor can be operated as a generator to charge a battery when the motor vehicle is braked.

According to the present invention, there is provided a motor vehicle driving system including a generator having a rotatable shaft coupled to the output shaft of an engine, a motor having a rotatable shaft directly coupled to an axle for driving a motor vehicle, means for energizing the motor with electric power generated by the generator, and means for operating the motor as a generator to charge a battery when the motor vehicle is braked.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
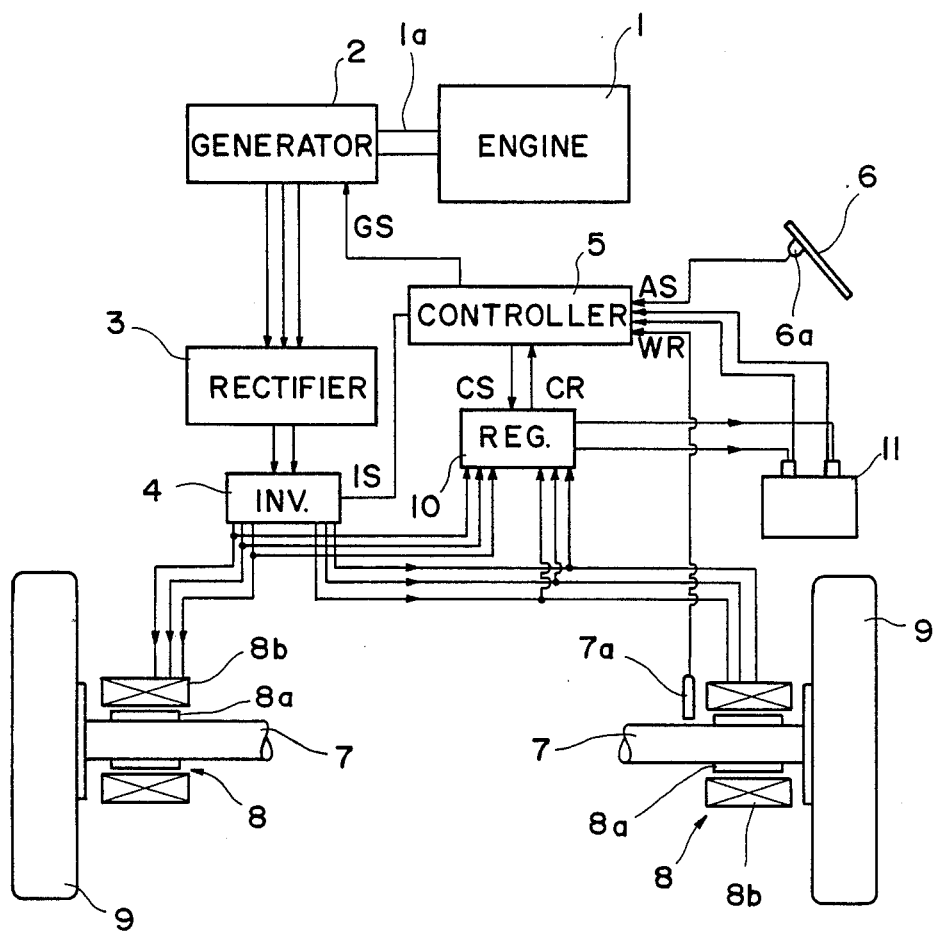
FIG. 1 is a block diagram of a motor vehicle driving system according to an embodiment of the present invention.

As shown in FIG. 1, a gasoline or diesel engine 1 which operates at high speed to produce power for driving a motor vehicle has an output shaft 1a directly coupled to the rotatable shaft of a generator 2. The engine 1 may be a gas turbine. Although not shown, the rotatable shaft of the generator 1 is provided with a rotor comprising a permanent magnet having strong residual magnetism, and a stator disposed in confronting relation to the rotor and composed of a core made of a magnetic material of small iron loss capable of meeting high-frequency flux changes and windings for inducing AC power thereacross.

A rectifier 3 converts the AC power supplied from the generator 2 to DC power which is supplied to an inverter 4 connected to the rectifier 3.

A controller 5 is supplied with a depression signal AS from an accelerator sensor 6a which detects the depth to which an accelerator pedal 6 is depressed, and a rotation signal WR from a rotation sensor 7a which detects the speed of rotation of an axle 7. The controller 5 determines the load on the engine based on the depression signal AS, and applies a control signal GS to the generator 2 to control operation of the generator 2. The controller 5 is also responsive to the depression signal AS and the rotation signal WR for supplying the inverter 4 with a conversion signal IS to control the frequency converting operation of the inverter 4 which converts DC power to AC power.

A motor 8 includes a rotor 8a comprising a strong permanent magnet and directly coupled coaxially to the axle, and a stator 8b constituting an AC motor and having windings coupled to the inverter 4. When the motor 8 is supplied with AC power from the inverter 4, in which the frequency is controlled by the depression signal AS and the rotation signal WR corresponding to the speed of rotation of the axle 7, the motor 8 is energized in a power running mode to drive the axle 7 for assisting in the rotation of a wheel 9. There are two wheels 9 coupled to the opposite ends of the axle 7, and two motors 8 are mounted on the axle 7 in combination with the wheels 9.

A regulator 10 has input terminals connected to the inverter 4 and the AC motor 8 and output terminals connected to a battery 11.

The regulator 10 comprises a rectifier for converting AC, power to DC power and is arranged to control the voltage of the rectified DC power in response to a charging signal CS from the controller 5 for regulating the electric power to be supplied to the battery 11. More specifically, when the rotation signal WR is higher than the depression signal AS, the conversion signal IS from the controller 5 to the inverter 4 is cut off to stop the operation of the inverter 4, and the regulator 10 is supplied with the charging signal CS which operates the regulator 10. At this time, each AC motor 8 is immediately converted to an AC generator to generate AC power with the rotation of the wheel 9. The generated AC power is converted by the regulator 10 to DC power that charges the battery 11. The wheel 9 is now subjected to regenerative braking.

The controller 5 always monitors the terminal voltage of the battery 11. If the terminal voltage drops below a prescribed level, then the controller 5 energizes the regulator 10 even when the motor 8 is in the power running mode, thereby to convert the AC power produced by the inverter 4 to DC power for charging the battery 11.

Operation of the motor vehicle driving system of the above construction will be described below.

When the engine 1 operates, the generator 2 coupled to the output shaft thereof generates AC power that is converted by the rectifier 3 to DC power, which is supplied to the inverter 4.

The controller 5 is supplied with a depression signal AS from the accelerator sensor 6a and a rotation signal WR from the rotation sensor 7a, and transmits to the inverter 4 a conversion signal which corresponds to the engine load and the speed of rotation of the axle 7. The inverter 4 is responsive to the conversion signal IS to convert the supplied DC power to AC power of a given frequency for energizing each motor 8 in the power running mode, and the AC power is supplied from the inverter 4 to the windings of the stator 8b of the motor 8. The motor 8 now drives the axle 7 to drive each of the wheels 9.

When the motor vehicle is braked, the controller 5 responds to the depression signal AS from the accelerator sensor 6a for applying a charging signal CS to the regulator 10. The regulator 10 then controls electric power generated by the motor 8, which now operates as a generator upon braking, and supplies the controlled power to the battery 11 to charge the same.

When the terminal voltage of the battery 11 drops, controller 5 senses the drop. The electric power generated by the generator 2 is fed via the rectifier 3 and the inverter 4 to the regulator 10 and is controlled thereby at a charging voltage related to the terminal voltage of the battery 11 in accordance with the charging signal CS from the controller 5 for charging the battery 11.

Figure 2:
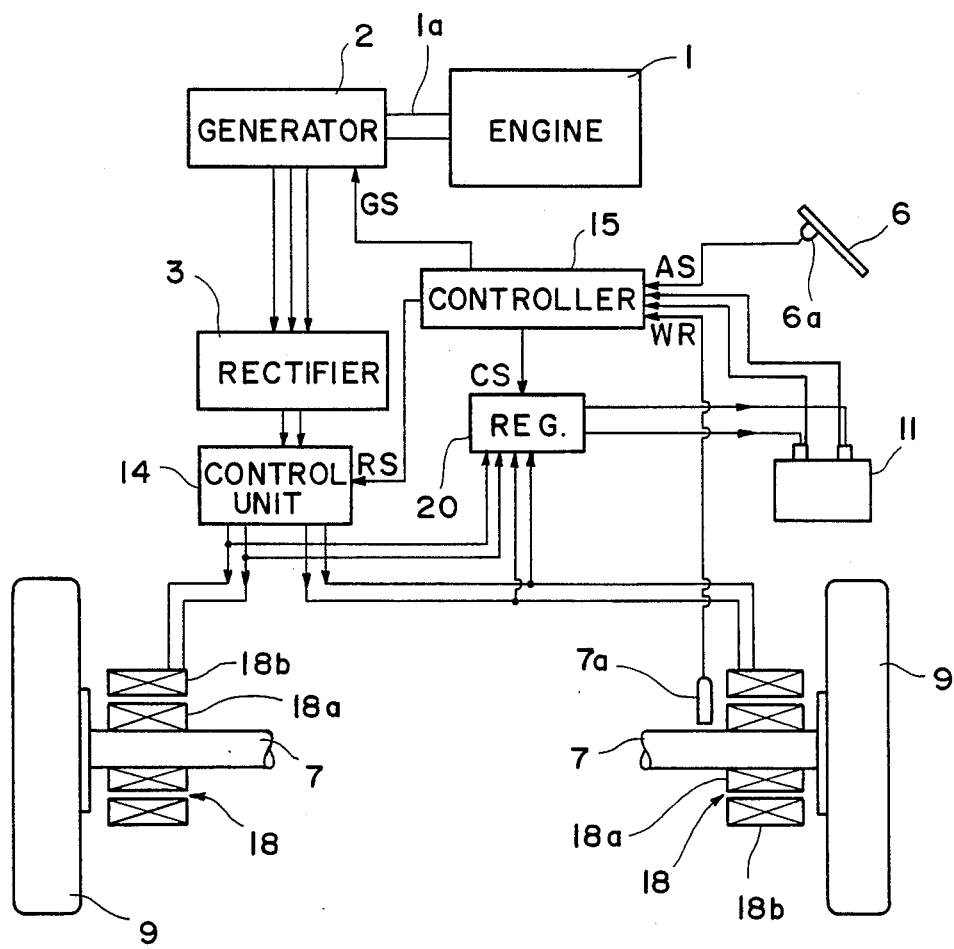
FIG. 2 is a block diagram of a motor vehicle driving system according to another embodiment of the present invention.

FIG. 2 is a block diagram showing another embodiment of the present invention. Those parts in FIG. 2 which are identical to those of FIG. 1 are denoted by identical reference characters, and will not be described in detail.

A control unit 14 serves to control the voltage of the DC power supplied from the rectifier 3 at a voltage corresponding to a control signal RS from a controller 15 and to supply the controlled DC power to each DC motor 18 on the axle 7.

The controller 15 is supplied with a depression signal AS from the accelerator sensor 6a and a rotation signal WR from the rotation sensor 7a, and transmits the control signal RS based on these supplied signals.

The DC motor 18 includes a rotor 18a mounted coaxially to the axle 7 and a stator 18b with its windings connected in series to the windings of the rotor 18a. The DC motor 18 is therefore a DC series motor having good speed/torque characteristics.

A regulator 20 serves to supply the output power from the motor 18 to the battery 11 to charge the same. When the motor vehicle is braked, the regulator 20 responds to a charging signal CS from the controller 15 to control the electric power, which is generated upon braking by the stator 18b. The controlled charging power is supplied to the battery 11. When the stored power of the battery 11 drops the battery 11 is charged by electric power fed from the generator 2 through the control unit 14.

The motor vehicle driving system of FIG. 2 will operate as follows:

AC power, generated by the generator 2 when the engine 1 operates, is converted by the rectifier 3 to DC power, which is supplied to the control unit 14.

In response to a depression signal AS and a rotation signal WR, the controller 15 applies a control signal RS corresponding to the engine load and the speed of rotation of the axle 7 to the control unit 14, which controls the voltage of the DC power from the rectifier 3. The DC power with a controlled voltage is then supplied from the control unit 14 to each of the DC motors 18.

The DC motor 18 rotates its rotor 18a with the supplied DC power in a power running mode for driving the axle 7 to assist in the rotation of the wheel 9.

When the motor vehicle is braked, the controller 15 responds to the depression signal AS to apply a charging signal CS to the regulator 20. The regulator 20 now controls DC power generated by the DC motor 18 which operates as a generator upon braking The controlled DC power is supplied to the battery 11 to charge the same.

When the terminal voltage of the battery 11 drops due to a reduction in the stored power of the battery 11 the controller 15 senses this drop, and, the regulator 20 is supplied with the DC power from the generator 2 through the rectifier 3 and the control unit 14, and controls the voltage of the supplied DC power at a voltage related to the terminal voltage of the battery 11 in accordance the charging signal CS from the generator 15. The controlled DC power is supplied to the battery 11 to charge the same.

Although certain preferred embodiments have been shown and described, it should be understood that many changes and modifications may be made therein without departing from the scope of the appended claims.

What we claim is:

1. A motor vehicle driving system for a motor vehicle which is driven by a motor supplied with electric power generated by a generator coupled to an engine, comprising:

an AC generator coupled to an engine;

a rectifier for converting AC power generated by said AC generator to DC power;

an inverter for converting DC power from said rectifier to AC power;

an AC motor selectively operable in a generator mode and being energizable by the AC power from said inverter for driving a wheel of the vehicle;

a battery chargeable by power generated by said AC generator and AC motor when operating in the generator mode;

a regulator having an input terminal coupled to a circuit which connects said inverter and said AC motor to each other and an output terminal coupled to said battery;

an accelerator sensor outputting a signal indicative of an amount of depression of an accelerator pedal which controls driving forces of the motor vehicle;

a rotation sensor outputting a signal indicative of rotational speed of said wheel; and a controller outputting a conversion signal for operating said inverter and a charging signal for operating said regulator, and being operable to cut off the conversion signal to said inverter to stop operation of the inverter and to apply said charging signal to said regulator to operate the regulator to rectify the output from the AC motor acting in the generator mode, and apply the DC voltage to said battery when the rotational speed of the wheel is higher than a rotational speed of the engine corresponding to the amount of depression of the accelerator pedal based on a comparison of the signals from said accelerator sensor and said rotation sensor.

2. A motor vehicle driving system according to claim 1, said controller further comprising means for detecting a voltage across the battery and means for activating said regulator to charge said battery with rectified power from said AC generator when the voltage across said battery drops below a predetermined voltage level.

3. A motor vehicle driving system for a motor vehicle which is driven by a motor supplied with electric power generated by a generator coupled to an engine, and includes an accelerator pedal for controlling driving forces of the motor vehicle, comprising:

an AC generator coupled to an engine;

a rectifier for converting AC power generated by said AC generator to DC power;

a control unit for controlling a voltage of the DC power produced by said rectifier;

a DC motor selectively operable in a generator mode and being energizable by the DC power from said control unit for driving a wheel of the vehicle;

a battery chargeable by power generated by said AC generator and DC motor when operating in the generator mode;

a regulator having an input terminal coupled to a circuit which connects said control unit and said DC motor to each other and an output terminal coupled to said battery;

an accelerator sensor outputting a signal indicative of an amount of depression of an accelerator pedal which controls driving forces of the motor vehicle;

a rotation sensor outputting a signal indicative of rotational speed of said wheel; and a controller for applying a control signal which cuts off the supply of power to the DC motor from said control unit and applying a charging signal to said regulator to operate the regulator to charge the battery when the rotational speed of the wheel is higher than a rotational speed corresponding to the amount of depression of the accelerator pedal as determined based on signals from said accelerator sensor and said rotation sensor.

4. A motor vehicle driving system according to claim 3, said controller further comprising means for detecting a voltage across the battery and means for activating said regulator to charge said battery with power from said AC generator when the voltage across said battery drops below a predetermined voltage level.

* * * * *